United States Patent [19]
Overbeck et al.

[11] 3,816,250

[45] June 11, 1974

[54] METHANE OXIDIZING BACTERIAL STRAIN M 102, A METHOD FOR OBTAINING IT AND A METHOD FOR SYNTHESIZING PROTEIN WITH IT

[75] Inventors: Jürgen Overbeck; Monir Naguib, both of Plön/Holstein, Germany

[73] Assignee: Max-Plank Gesellschaft zur Forderung der Wissenschaften e.V., Gottingen, Germany

[22] Filed: Sept. 15, 1971

[21] Appl. No.: 180,732

[30] Foreign Application Priority Data
Sept. 15, 1970 Germany............................. 2045589
Apr. 29, 1971 Germany............................. 2121212

[52] U.S. Cl............................................. 195/28 R
[51] Int. Cl............................................. C12b 1/00
[58] Field of Search....................... 195/28 R, 3, 3 H

[56] References Cited
UNITED STATES PATENTS
3,384,491  5/1968  Guenther................................. 99/9
3,649,459  3/1972  Wolnak.................................. 195/96

*Primary Examiner*—Lionel M. Shapiro
*Assistant Examiner*—R. B. Penland
*Attorney, Agent, or Firm*—Christen & Sabol; Virgil H. Marsh

[57] ABSTRACT

The methane oxidizing bacterial strain "M 102" in the form of a highly active pure culture negative as regards Gram staining, acid fast staining, spore staining, flagellae staining, and capsule staining, forms microcolonies on mineral agar nutrient media which are invisible for the naked eye but can be detected microscopically and is capable of converting, on a dry matter basis, 1 part by weight of methane into approximately 0.8 part by weight of bacterial substance.

2 Claims, 5 Drawing Figures

METHANE OXIDIZING BACTERIAL STRAIN M 102, A METHOD FOR OBTAINING IT AND A METHOD FOR SYNTHESIZING PROTEIN WITH IT

The invention relates to a methane oxidizing bacterial strain, designated "M 102", in the form of a highly active pure culture, a method of obtaining it, and to the application of the strain for the microbial synthesis of proteins from methane.

Methane oxidizing bacteria, which for their metabolism require methane, which is available in the form of natural gas in enormous quantities, as their only source of carbon, are not only of scientific but also of great economic importance, since they present the opportunity of converting food protein which is urgently required for the nutrition for the constantly increasing population of the World.

Therefore for a number of years research has been carried out as regards the obtaining of methane oxidizing bacteria from aquatic biotopes, in which the metabolic conditions for such bacteria are favourable. All attempts to obtain such bacteria in the form of highly active pure cultures have, however, not been successful as yet and it was only possible to obtain mixed cultures. However, the purer such mixed cultures are, the less their activity in the conditions in which the metabolism of methane oxidizing bacteria occurs. Furthermore there is the disadvantage that these known mixed cultures generally separate out in the given metabolic condition and that they lead to a complicated mixture of products of metabolism which are difficult to separate.

Thus for example in "Microbiologiya", Vol. 38, (1969) pages 251 to 257, there is a description of the isolation of approximately 100 strains of methane oxidizing bacteria from the most various different biotopes, that is to say from the ground, mud and water. The cultures obtained are admittedly termed "pure cultures", but they are clearly defined as mixed cultures: thus it is a case, for example, not of true methane oxidizing organisms, since they do not necessarily require methane for their metabolism and can grow on organic nutritional media in the absence of methane; furthermore these bacterial cultures, termed "pure" are less stable and less active under typical metabolic conditions for methane oxidizing bacteria than mixed cultures which are at the outset termed "complex". The known enriched and mixed cultures are therefore completely unsuitable for industrial applications.

One aim of the invention is to provide a methane oxidizing bacterial strain, which can be produced in the form of a highly active pure culture, and furthermore grows rapidly, is practically specific to methane and is stable, that is to say it maintains its capability of using methane as the only source of carbon both in the pure condition and under typical metabolic conditions for methane oxidizing micro-organisms.

A further object of the invention is to provide a method for the production of such a bacterial strain and its use for the microbial synthesis of proteins from methane.

The invention is based on the surprising discovery that the aim mentioned can be attained in a particularly advantageous manner by isolating methane oxidizing bacteria of the given type not from natural biotopes, in which the conditions for metabolism of such bacteria are given and in which methane and oxygen are present in a sufficient quantity, but from so-called limiting biotopes, in which the conditions for a normal course of metabolism of such bacteria are not given owing to lack of oxygen.

The subject matter of the invention resides in the methane oxidizing bacterial strain M 102 in the form of a highly active pure culture negative as regards Gram staining, acid fast staining, spore staining, flagellae staining, and capsule staining, forms micro-colonies on mineral agar nutrient media which are invisible for the naked eye but can be detected microscopically and is capable of converting, on a dry matter basis, 1 part by weight of methane into approximately 0.8 part by weight of bacterial substance.

The invention also relates to a method for the production of the given methane oxidizing bacteria strain M 102 in the form of a highly active pure culture, which is characterised in that the bottom or ground sediment of an aquatic limiting biotope, in which the conditions for the course of metabolism of a methane oxidizing bacteria strain are not present owing to the absence of oxygen, is aerated with an approximately 1 to 1 methane air mixture in a mineral nutrient solution, smears of the bacterial enrichment culture from the mineral nutrient solution are transferred to a mineral agar nutrient medium, from bacterial colonies formed on the mineral agar nutrient medium individual cells are isolated, the latter are reproduced in an approximately 1 to 1 by volume methane air mixture and the bacterial pure cultures formed are isolated.

The invention also relates to the application of the bacterial strain M 102 mentioned for the microbial synthesis of proteions from methane by innoculating a mineral nutrient solution with the bacterial strain M 102, placing the innoculated mineral nutrient solution into a fermenter, passing an 1 to 1 by volume methane air mixture over the nutrient solution in the fermenter, isolation of the bacterial cultures formed in the mineral nutrient solution, separation of the protein component from the isolated bacteria and, possibly, purification of the protein fraction obtained.

The bacterial strain in accordance with the invention is designated "M 102" in order to distinguish it from known bacterial strains and for purposes of clarification.

For carrying out the method of the invention various ground or bottom sediments of aquatic biotopes have been found particularly advantageous, in which although methane occurs in abundance, there is, however, a practically complete absence of oxygen owing to bacterial reduction. The determination of the oxygen concentration of such biotopes or the detection of reducing bacteria can be carried out in a conventional manner. Biotopes of the type given are termed "limiting biotope". The meaning of limiting biotopes for the isolation of certain metabolic types has apparently been ignored as yet and it is only with the method of the invention that it has been logically taken into account.

Various lakes in North Germany were investigated for suitable limiting biotopes. A particularly suitable biotope was found near the shore in the estate of the Max-Planck-Institut fuer Limnologie on the Western side of the Schoehsee near Ploen in Holstein. For carrying out the method of the invention bottom sediments taken from a biotope of the type given was firstly cultured to produce a bacterial enrichment culture. For culturing the bacterial enrichment culture the bottom sediment incorporated in a liquid mineral nutrient solution was aerated with a gas mixture of methane and air in a volume ratio approximately 1 to 1 in a conventional fermenter.

A liquid mineral nutrient solution found to be suitable is for example the nutrient solution described by Kaserer in "Zbl. Bakt.", II. Abt., Bd. 15 (1906) pages 573 to 576, which is provided with 1 ml. of a so-called Hoagland A–Z solution per liter, as for example described by E. G. Pringsheim in "Algenreinkulturen, ihre Herstellung und Erhaltung", Fischer-Verlag Jena (1954), pages 1 to 109. A further nutrient solution suitable is that described by Leadbetter and Foster in "Arch. f. Mikrobiol.", Vol. 30, (1958), pages 91 to 118.

The formation and the growth of the bacterial enrichment cultures in the mineral nutrient solution of the type given can be followed in a conventional manner, with for example measurements of opacity in the bacteria containing nutrient solution in a conventional photometer at a wave length of 420 mm. A distinct opacification or cloudiness can usually be detected after treating the bacteria containing nutrient solution with gas for only 1 day. After several days it is possible to show that there is an intense growth of bacteria with the help of cloudiness or opacity measurements and also macroscopically and microscopically.

For carrying out the method of the invention samples of the bacterial enrichment culture are then transferred in the form of smears to a mineral agar nutrient medium. It has been found advantageous to use, as a nutrient medium of the type given, a mineral nutrient solution of the type given mixed with, for example so-called "Bacto-Agar" in a concentration of 1.5 percent.

The bacterial applied in the form of smears to the mineral agar nutrient medium, form micro-colonies on the latter. The micro colonies are not visible with the naked eye and can only be seen with the help of a magnifiying glass or with a microscope. The unsual type of growth is apparently typical for the bacteria strain M 102 in accordance with the invention. From the overall impression and the appearance of the micro-colonies a man in the art can see that it is a question of uniform populations.

For carrying out the method of the invention individual cells are isolated from the bacteria colonies formed, for example with the help of a so-called micromanipulator as can be obtained commercially. The individual cells isolated are then reproduced in droplets of nutrient solution, advantageously in the form of droplets of mineral nutrient solution of the type given, and in the drops are aerated with an 1 to 1 by volume methane air mixture. In this manner bacterial pure cultures are formed in the nutrient solution droplets and the cultures can be isolated in a conventional manner.

The bacterial pure cultures obtained are preferably investigated as to purity by making further smears. In this respect it can be seen that the methane oxidizing bacterial strain obtained in accordance with the method of the invention is to be considered a pure culture on the basis of criteria generally applied for such purposes, for example as regards the growth on a solid surface, behaviour in biochemical tests and the appearance in optical and electro microscopes.

The methane oxidizing bacteria strain M 102 in accordance with the invention is found to be especially suitable as a micro-organism for the microbial synthesis of proteins for methane on the basis of its particularly advantageous characteristics.

Methane, which in the form of natural gas is available in enormous quantities, has not to date been used for nutritional purposes, since for this purpose micro-organisms of sufficient purity and stability and taking methane as their only source of carbon for the synthesis of cell protein have not been available.

The microbial utilisation of natural products for nutritional purposes, that is to say the conversion of petroleum fractions, more particularly waste products of the petroleum industry, into proteins for nutrition has already been proposed. The micro-organisms used for carrying out these know methods have, however, usually been yeasts or algae.

For carrying out the microbial synthesis of protein from methane with the help of the bacterial strain M 102 in accordance with the invention it is possible to use fermenters, conventional for such purposes, for example large scale fermenters, which are provided with devices for the continual replenishment of the nutrient solution and for removal of the protein containing products of metabolism formed.

Microbial protein synthesis can be carried out both continuously and also discontinuously. In the case of continuous synthesis so-called flowing cultures are used and the methane content of the methane air mixture used for treating the nutrient solution is checked continuously in a conventional manner, for example by gas chromatography, and on the basis of the values obtained the composition of the methane air mixture is controlled in such a manner that the volume ratio of methane to air amounts to approximately 1 to 1.

Continuous synthesis can also be carried out chemostatically, in which an even flow of nutrient solution flows through the fermenter, and also turbidostatically in which the density of the micro organism culture is kept constant.

In the case of discontinuous or batch performance of the microbial protein synthesis the methane air mixture with a volume ratio of 1 to 1, fed into the fermenter can be used until the oxygen is practically completely used up.

The invention will now be described with reference to the accompanying drawings in more detail.

Figure 1:
FIGS. 1 and 2 are electron microscope views of individual bacteria of the strain M 102.
Figure 2:
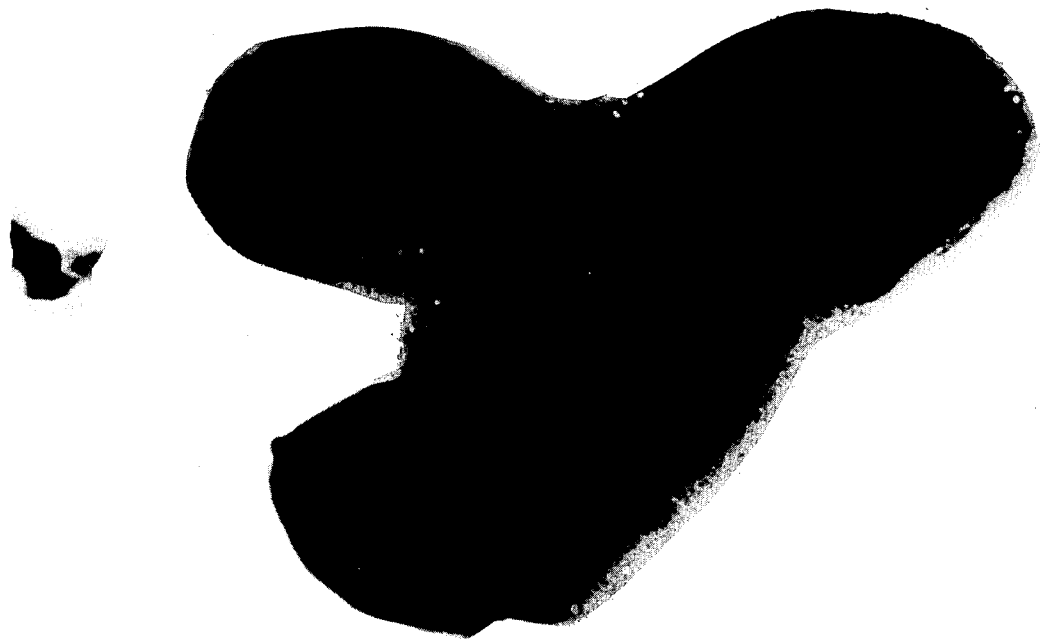

The electron microscope views shown in FIGS. 1 and 2 indicate that the bacteria of the strain M 102 are in the form of rods and are surrounded by a more or less pronounced mucous layer.

Figure 3:
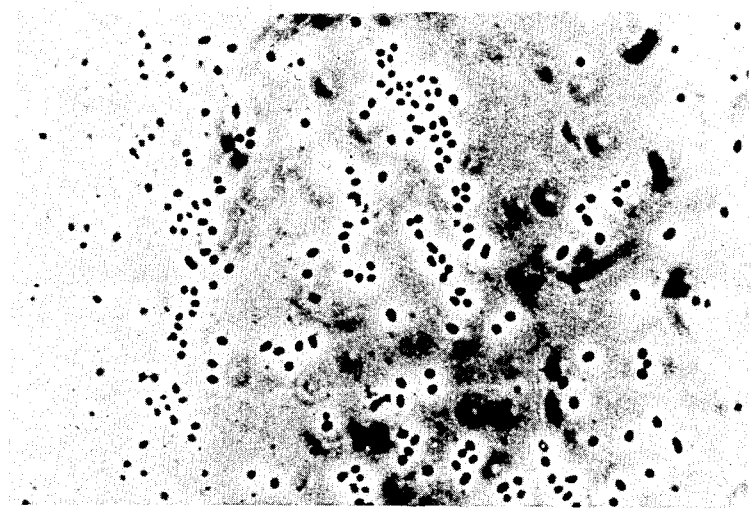
FIGS. 3 and 4 are optical microscope views of bacteria of strain M 102.
Figure 4:
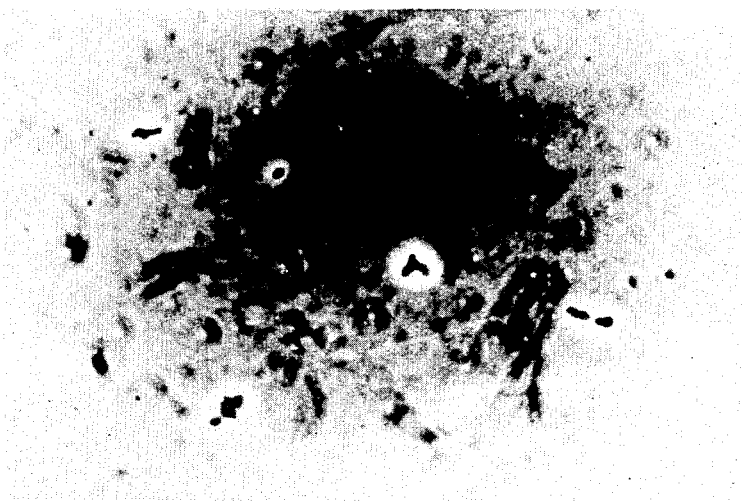

The optical microscope views of FIGS. 3 and 4 of the bacteria of the strain M 102 indicate that the bacteria are either free living or collect together in accordance with the thickness of the mucous layer. If the individual bacteria are surrounded by a mucous layer of comparatively small thickness (see FIG. 1) the individual bacteria are free living (see FIG. 3). If the individual bacteria are surrounded by comparatively thick mucous layer (see FIG. 2) the individual bacteria adhere together (see FIG. 4).

It can be seen from the microphotographs that the bacteria have a length of approximately 1.5 microns and a breadth of approximately 0.8 microns.

Figure 5:
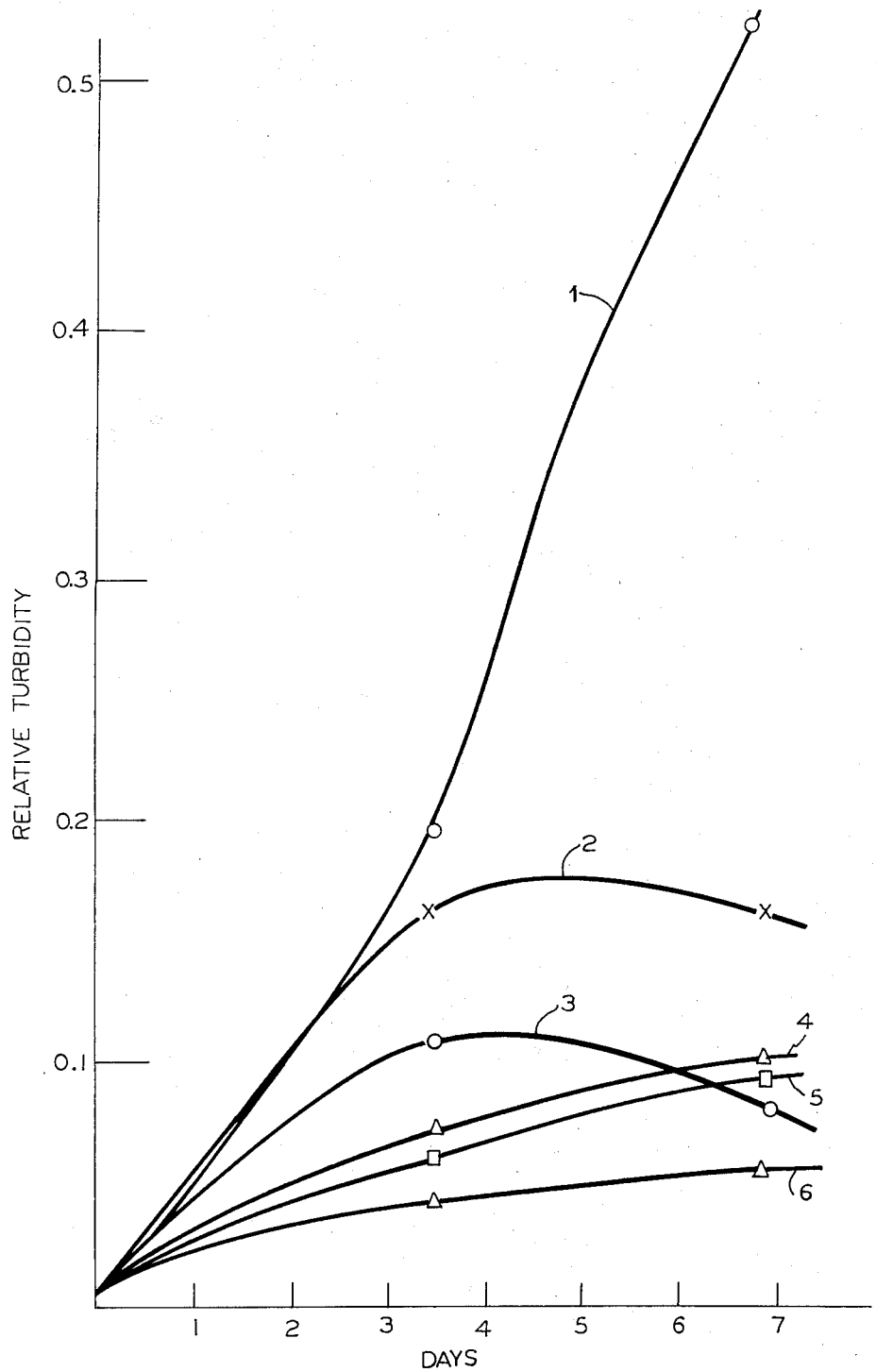
FIG. 5 is a graph of the results of the growth test described in example 3.

The growth curves shown in FIG. 5 are discussed in connection with the example 3 given below.

The bacterial strain M 102 in accordance with the invention was deposited on 31. 3. 1971 in the Strain Collection of the Microbiological Department of the Chemisch-Physiologisches Institut of the Johann-Wolfgang-Goethe-University in Frankfurt am Main with the deposit number PM 102/71.

The following examples are intended to explain the invention in more detail.

Example 1

For the isolation of the methane oxidizating bacteria strain M 102 a bottom sediment sample was taken near the shore on the Western side of the Schoehsee in the estate of the Max-Planck-Institut fuer Limnologie. 1 g of the bottom sediment was placed in 50 ml. of Kaserer-solution of the type given which per liter of solution contained 1 ml. Hoagland A-Z solution of the type given. The bacteria containing mineral nutrient solution obtained was placed in a fermenter with a capacity of approximately 200 ml. and at a culturing temperature of 27°C was aerated with a gas mixture consisting of equal volumes of methane and air. The solution was shaken with the help of a round shaking machine. All manipulations were carried out under sterile conditions. As regards the method of isolation attention is directed to pages 17 to 36 in Z. f. allg. Mikrobiologie, Vol. 10, (1970).

Samples were taken daily in the morning and in the evening from the nutrient solution treated with the gas and the cloudiness of the samples was measured at a wave length of 420 nm with the help of a spectral photometer of a conventional type. Even after 1 day a distinct cloudiness was to be seen. After 3 days dense growth of bacteria could be seen. This growth could not only be detected by measurements of cloudiness but also macroscopically and microscopically.

From the enrichment culture smears were placed on a mineral agar nutrient medium which contained a mineral nutrient solution, of the given type in the form of a gel, and containing 1.5 percent so-called Bacto-Agar. After five days of treatment with the given methane air mixture bacteria micro colonies had formed on the nutrient medium. These colonies could only be seen with a strong magnifying glass or with the help of a microscope. The overall appearance of these micro-colonies led one to conclude that there was a uniform population. With the help of a so-called micro-manipulator of a conventional type individual cells were isolated in a conventional manner. The isolated individual cells were treated with a gas mixture consisting of 1 part of methane and 1 part of air in droplets of mineral nutrient solution of the type given. After approximately 5 days bacterial pure cultures formed from the individual cells in the nutrient solution droplets. These individual cells were isolated in a conventional manner. From analysis by gas chromatography of the metabolism of the bacteria it could be seen that from one part by weight of methane approximately 0.8 to 0.9 parts by weight of cell substance were found.

Example 2

For determination of the growth characteristics of the bacterial strain from the compound given in the following table I substrates were produced in the form of 1 percent solutions in a mineral nutrient solution of the type given. The substrates were innoculated with the pure culture to be tested of the methane oxidizing bacterial strain M 102 following which growth was tested in accordance with the method given by Skerman in "A Guide to the Identification of the Genera of Bacteria" (1959), Baltimore:Williams and Wilkins, pages 217 et seq. The results given are presented in the following table I. The signs used in the table I have the following meanings: — no utilisation, ± slight utilisation, + distinct utilisation.

TABLE I

| Substrate | 3rd day | 7th day | 21st day |
|---|---|---|---|
| Carbo-hydrates: | | | |
| Glucose | − | − | − |
| Fructose | − | − | ± |
| Galactose | − | − | − |
| Mannose | − | − | − |
| Ribose | − | ± | ± |
| Arabinose | ± | + | + |
| Lactose | − | − | − |
| Maltose | − | − | − |
| Saccharose | − | − | − |
| Starch | ± | ± | ± |
| Inulin | − | − | − |
| Cellulose | − | − | − |
| Alcohols: | | | |
| Methanol | ± | ± | ± |
| Ethanol | − | − | − |
| Propanol | − | − | − |
| Butanol | − | − | − |
| Isoamyl alcohol | − | − | − |
| Benzene | − | − | − |
| Aldehydes: | | | |
| Formaldehyde | − | − | ± |
| Acetaldehyde | − | − | − |
| Benzenaldehyde | − | − | − |
| Fatty acids: | | | |
| Formic acid | ± | ± | + |
| Acetic acid | + | + | + |
| Propionic acid | + | + | + |
| Amino acids: | | | |
| Glycine | − | − | − |
| Cystine | − | − | − |
| Alanine | − | − | − |
| Phenylalanine | − | − | − |
| General reactions: | | | |
| Indol formation | ± | − | − |
| Methyl red test | − | − | − |
| Catalase | + | + | + |
| Oxidase | + | + | + |
| McConkey Broth | − | − | − |
| Litmus milk | − | − | − |
| Gelatin liquefaction | − | − | − |

The results show that of the substrates given, that is to say carbo-hydrates, alcohols, aldehydes, fatty acids and amino acids only the fatty acids tested were clearly decomposed, while on the other hand the other substrates tested were not utilised or were only utilized with slight extent. The bacterial strain M 102 thus has a clear substrate specifity and apart from methane hardly uses any other sources of carbon.

Example 3

For further determination of the growth characteristics of the bacterial strain M 102 in accordance with the invention substrate solutions were produced by the addition of organic compounds in a concentration of 1 percent to a mineral nutrient solution of the type given. The substrate sulotions obtained were innoculated with the pure culture of the strain M 102 to be tested and cultured in a fermenter in a conventional manner (optimum pH 7, optimum temperature 27°C, shaking machine).

For purposes of comparison a growth test was carried out in which the mineral nutrient solution did not have any organic compound added to it and instead the innoculated mineral nutrient solution was aerated with a gas mixture consisting of 1 part by volume of methane and 1 part by volume of air.

The bacteria growth was determined by measurements of cloudiness at 420 mm on nutrient solution samples which were taken after 3½ and 7 days. The results obtained were evaluated in the form of a graph. The growth curves obtained in this manner are shown in FIG. 5.

The organic compounds used as a substrate for carrying out the above growth tests and the reference numerals applied to the corresponding growth curves in FIG. 5 are presented in the following table:

| Substrate: | Reference numeral of the corresponding growth curve in FIG. 5 |
|---|---|
| Methane | 1 |
| Meat extract | 2 |
| Yeast extract | 3 |
| Methanol | 4 |
| Peptone | 5 |
| Glycerin | 6 |

The results represented by way of a graph in FIG. 5 show that the strain M 102 is practically specific to methane.

Example 4

For further characterisation of the methane oxidizing bacterial strain M 102 in accordance with the invention the following staining tests were carried out as given in table II. As regards such staining tests conventional in bacterialogy reference can be made for example to the book of Janke and Dickscheit "Handbuch der mikrobiologischen Laboratoriums technik", published by Th. Steinkopff, Dresden, 1957, pages 128 et seq. The results obtained are also given in table II.

TABLE II

| Test | Result |
|---|---|
| Gram Staining | negative |
| Staining as regards acid coloration | negative |
| Spore Staining | negative |
| Flagellae Staining | negative |
| Capsule Staining | negative |

The results show that in the case of the stains used in the tests the bacterial cells do not contain any acceptors.

Example 5

For determining the methane oxidation activity of the bacterial strain M 102 obtained in accordance with the method of the invention 1 l of mineral nutrient solution of the type given was placed in a 5 l fermenter and was innoculated with the bacterial strain to be tested. The innoculated nutrient strain was aerated at a temperature of 27°C with methane air mixture in a volume ratio of 1 to 1. After 5 days considerable growth of bacteria had occurred in the nutrient solution. The bacterial culture obtained was isolated. The yield amounted to 1.5 g on the basis of the dry matter. On the basis of the methane supplied one part by weight of methane had led to the formation of 0.8 units by weight of bacterial dry matter. Only approximately 20 percent of the methane supplied was thus used for respiration, so that there was a practically quantative conversion of the methane carbon into cell substance.

Example 6

For the microbial synthesis of proteins from natural gas the methane oxidizing bacterial strain M 102 in accordance with the method given in Example 5 was used for the innoculation of 1 l sterilised mineral nutrient solution of the type given, which per liter of so-called Kaserer-solution contained 1 ml. of so-called Hoagland A–Z solution. The innoculated mineral nutrient solution was aerated in the 5 l fermenter already mentioned while being shaken in a round shaking machine at a temperature of 27°C. The gas used for aeration was a natural gas-air mixture with a volume ratio of 1 to 1.

The growth of the bacterial culture was so rapid that after only 1 day there was a clear clouding of the nutrient solution. After 5 days the bacterial culture had developed so as to correspond to approximately 1.5 g of dry matter. The bacteria formed were separated in accordance with conventional methods from the nutrient solution. The bacteria formed consisted, as a percentage of the dry matter, of approximately 70 percent protein, the rest being mainly carbo-hydrates, lipids and cell wall components. The protein components were isolated in accordance with known methods.

For isolation the method described for example in "Z. f. allg. Mikrobiologie", Vol. 10, (1970), pages 17 to 36, can be used. The protein content of the isolated cells could be determined, for example by the method given by Lowry and Lopez, as described for example in G. Drews "Mikrobiologisches Praktikum fuer Naturwissenschaftler", Springer-Vertag, Berlin-Heidelberg-New York, 1968, pages 110.

The yield calculations show that, on the basis of the methane consumption, from 1 part by weight of natural gas approximately 0.8 parts by weight of bacteria dry matter is formed and only 20 percent of the methane is used in respiration. This corresponds to the highest yield which has ever been obtained in the assimilation of alkanes.

What is claimed is:

1. The microbial synthesis of proteins using methane oxidizing bacterial strain M 102 from methane comprising: (a) placing a sterile mineral nutrient solution, or such a solution to be sterilized, in a fermenter, (b) innoculating the mineral nutrient solution with methane oxidizing bacterial strain M 102, (c) passing a methane-air mixture or natural gas-air mixture, which has a volume ratio of approximately 1 to 1, over the nutrient solution located in the fermenter, (d) isolating the bacterial culture formed in the mineral nutrient solution, and (e) separating the protein components from the other components of the isolated bacterial culture, said other components being mainly carbohydrates, lipids and cell wall components.

2. The microbial synthesis of proteins in accordance with claim 1, wherein, after step e, said protein components are purified.

* * * * *